US007304647B2

(12) United States Patent
Hong et al.

(10) Patent No.: US 7,304,647 B2
(45) Date of Patent: Dec. 4, 2007

(54) GENERATING TEXTURE MAPS FOR USE IN 3D COMPUTER GRAPHICS

(75) Inventors: Qi He Hong, Bracknell (GB); Adam Michael Baumberg, Bracknell (GB); Alexander Ralph Lyons, Bracknell (GB)

(73) Assignee: Canon Europa N.V., Amstelveen (NL)

( * ) Notice: Subject to any disclaimer, the term of this patent is extended or adjusted under 35 U.S.C. 154(b) by 80 days.

(21) Appl. No.: 10/810,605

(22) Filed: Mar. 29, 2004

(65) Prior Publication Data

US 2004/0196294 A1 Oct. 7, 2004

(30) Foreign Application Priority Data

Apr. 2, 2003 (GB) ................................ 0307652.8

(51) Int. Cl.
*G09G 5/00* (2006.01)
*G06T 17/20* (2006.01)
*G06T 17/00* (2006.01)

(52) U.S. Cl. ...................... 345/582; 345/423; 345/428; 345/587

(58) Field of Classification Search ........ 345/582–587, 345/420, 423, 428; 382/164
See application file for complete search history.

(56) References Cited

U.S. PATENT DOCUMENTS 5,367,615 A * 11/1994 Economy et al. ........... 345/428
6,246,414 B1 * 6/2001 Kawasaki ................... 345/419
6,333,746 B1 * 12/2001 Vaswani et al. ............ 345/582
6,516,099 B1 2/2003 Davison et al. ............. 382/284
6,647,146 B1 11/2003 Davison et al. ............. 382/199
6,668,082 B1 12/2003 Davison et al. ............. 382/190
6,791,540 B1 9/2004 Baumberg .................. 345/419
6,897,977 B1 * 5/2005 Bright ....................... 358/1.18
6,970,591 B1 11/2005 Lyons et al. ................ 382/154

(Continued)

FOREIGN PATENT DOCUMENTS

EP 1 204 073 A2 5/2002

OTHER PUBLICATIONS

W.K. Pratt, "Digital Image Processing," Second Edition, John Wiley & Sons, Inc., Section 6.4.2, pp. 163-168, ISBN 0-471-85766-1.

(Continued)

*Primary Examiner*—Kee M. Tung
*Assistant Examiner*—Hau H Nguyen
(74) *Attorney, Agent, or Firm*—Fitzpatrick, Cella, Harper & Scinto

(57) ABSTRACT

A texture map for texturing the polygon mesh of a 3D computer model during rendering is generated by defining a respective triangle within the texture map for each triangle in the polygon mesh to create a texture coordinate map, and allocating image data to each defined triangle. To generate the texture coordinate map, the triangles are defined so that the area of each triangle is dependent upon the content of texture data to be stored therein. More particularly, triangles required to store texture data with a relatively large amount of detail have a relatively large area and triangles which are required to store texture data with relatively little detail have a relatively small area. In this way, more area is allocated for the storage of detailed texture data, thereby reducing the amount of information which is lost from the texture data during the creation of a texture map.

39 Claims, 7 Drawing Sheets

U.S. PATENT DOCUMENTS

| | | | | |
|---|---|---|---|---|
| 6,980,690 | B1 | 12/2005 | Taylor et al. | 382/154 |
| 2002/0061130 | A1 | 5/2002 | Kirk et al. | 382/154 |
| 2002/0085748 | A1 | 7/2002 | Baumberg | 382/154 |
| 2002/0186216 | A1 | 12/2002 | Baumberg et al. | 345/422 |
| 2002/0190982 | A1 | 12/2002 | Kotcheff et al. | 345/420 |
| 2003/0001837 | A1 | 1/2003 | Baumberg | 345/419 |
| 2003/0063086 | A1 | 4/2003 | Baumberg | 345/420 |
| 2003/0085890 | A1 | 5/2003 | Baumberg et al. | 345/420 |
| 2003/0085891 | A1 | 5/2003 | Lyons et al. | 345/420 |
| 2003/0160785 | A1 | 8/2003 | Baumberg | 345/419 |
| 2003/0189567 | A1 | 10/2003 | Baumberg | 345/419 |
| 2003/0218607 | A1 | 11/2003 | Baumberg | 345/419 |
| 2004/0104916 | A1 | 6/2004 | Hong et al. | 345/582 |
| 2004/0155877 | A1 | 8/2004 | Hong et al. | 345/419 |
| 2004/0247174 | A1 | 12/2004 | Lyons et al. | 382/154 |
| 2005/0052452 | A1 | 3/2005 | Baumberg | 345/419 |
| 2005/0151751 | A1 | 7/2005 | Hong et al. | 345/582 |

OTHER PUBLICATIONS

M. Maruya, “Generating A Texture Map From Object-Surface Texture Data,” EUROGRAPHICS ’95, Vol. 14 (1995), No. 3, pp. C397-C405.

R. Jain, et al., “Machine Vision,” publisbed by McGraw-Hill, Inc., Chapters 5.2.1 and 5.2.2, pp. 146-148, ISBN 0-07-113407-7.

P. J. Sloan, et al., “Importance Driven Texture Coordinate Optimization,” EUROGRAPHICS ’98, vol. 17 (1998), No. 3.

L. Balmelli, et al., “Space-Optimized Texture Maps,” EUROGRAPHICS 2002, vol. 21 (2002), No. 3.

A. Hunter, et al., “Uniform Frequency Images: Adding Geometry To Images To Produce Space-Efficient Textures,” in Proceedings of the Conference on Visualization ’00, Salt Lake City, Utah, USA (2000), pp. 243-251, ISBN: 1-58113-309-X.

* cited by examiner

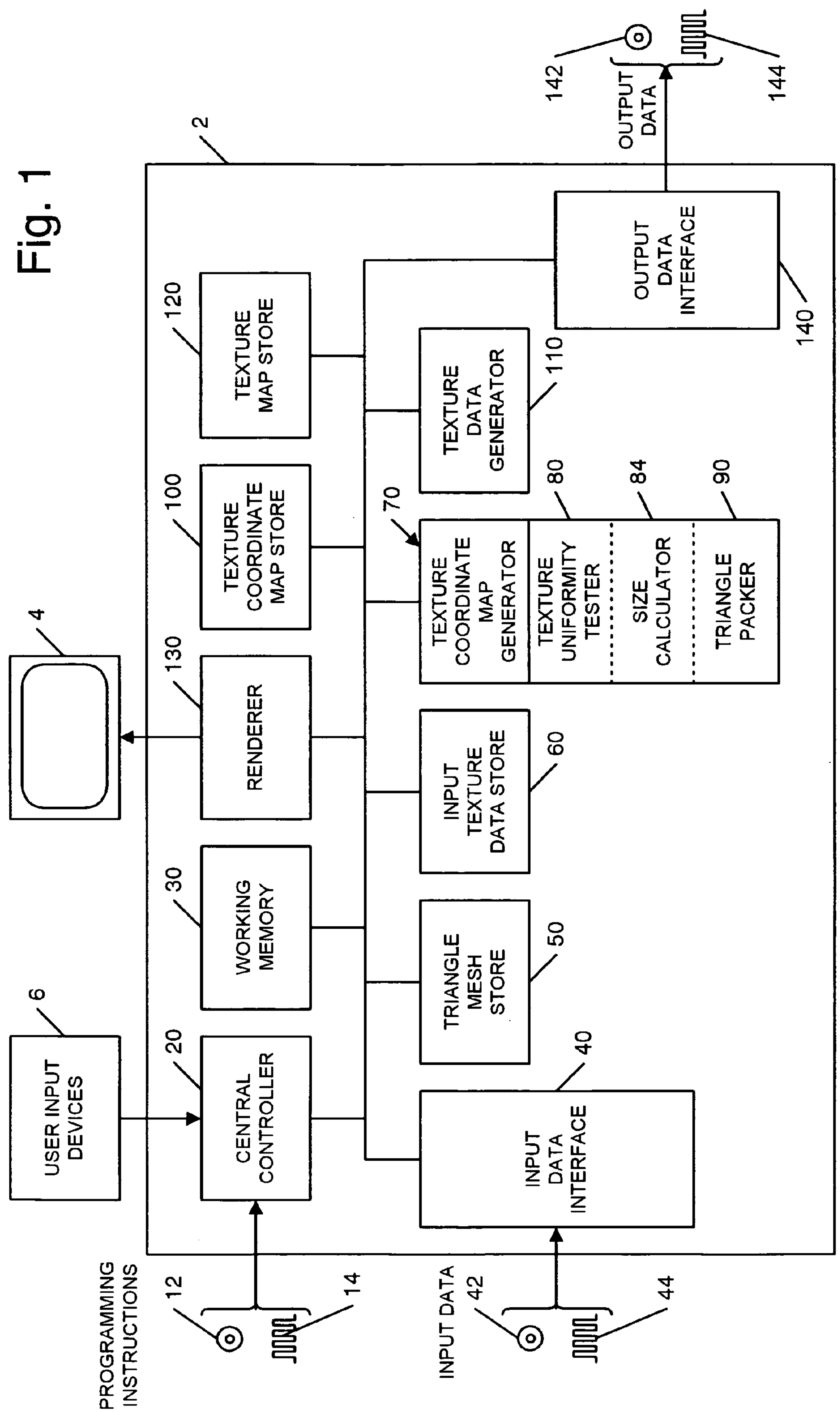
Fig. 1
2
4
6
USER INPUT DEVICES
20
CENTRAL CONTROLLER
30
WORKING MEMORY
130
RENDERER
100
TEXTURE COORDINATE MAP STORE
120
TEXTURE MAP STORE
40
INPUT DATA INTERFACE
50
TRIANGLE MESH STORE
60
INPUT TEXTURE DATA STORE
70
TEXTURE COORDINATE MAP GENERATOR
80
TEXTURE UNIFORMITY TESTER
84
SIZE CALCULATOR
90
TRIANGLE PACKER
110
TEXTURE DATA GENERATOR
140
OUTPUT DATA INTERFACE
OUTPUT DATA
142
144
PROGRAMMING INSTRUCTIONS
12
14
INPUT DATA
42
44

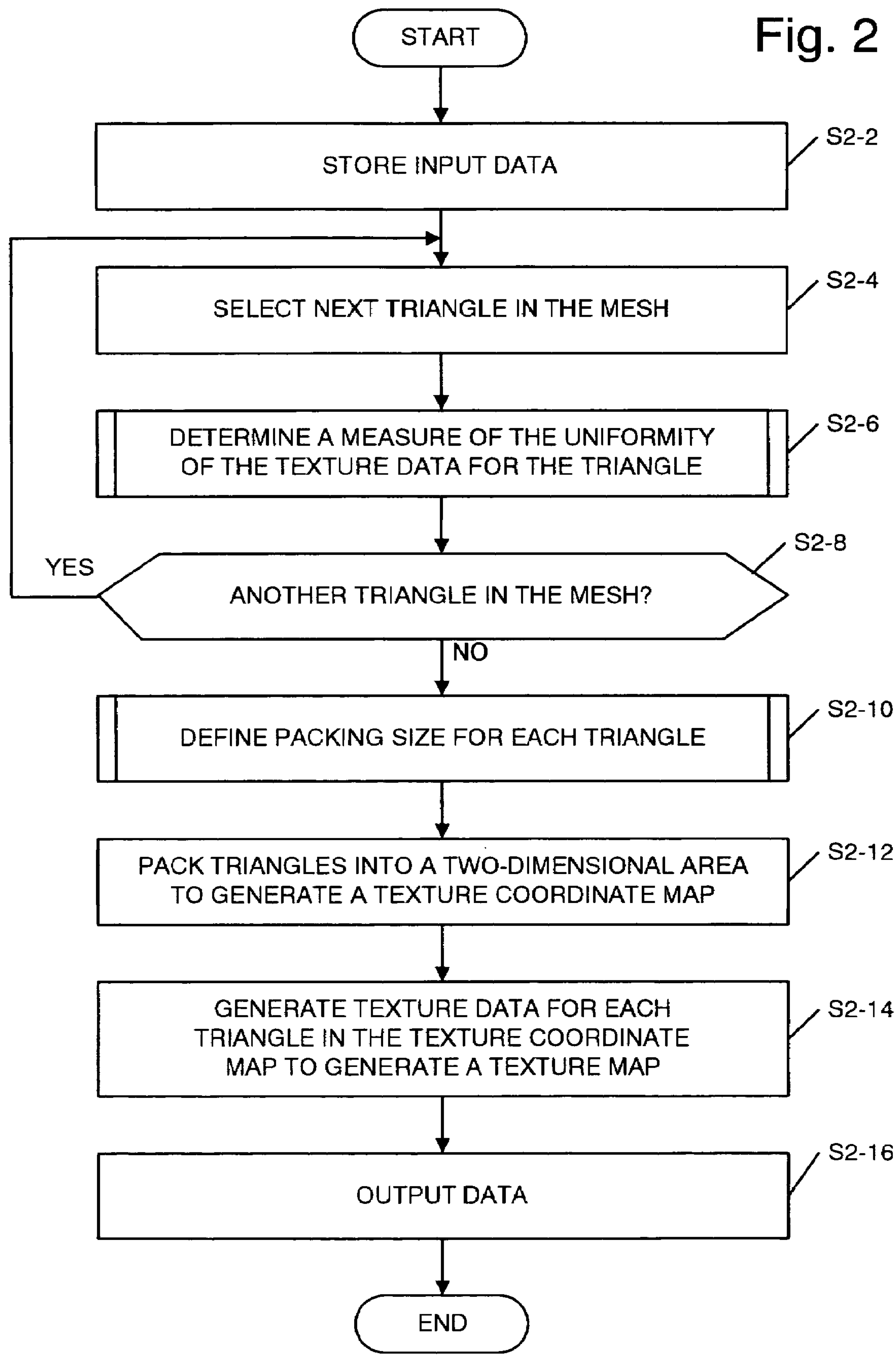
Fig. 2
START
STORE INPUT DATA
S2-2
SELECT NEXT TRIANGLE IN THE MESH
S2-4
DETERMINE A MEASURE OF THE UNIFORMITY OF THE TEXTURE DATA FOR THE TRIANGLE
S2-6
ANOTHER TRIANGLE IN THE MESH?
S2-8
YES
NO
DEFINE PACKING SIZE FOR EACH TRIANGLE
S2-10
PACK TRIANGLES INTO A TWO-DIMENSIONAL AREA TO GENERATE A TEXTURE COORDINATE MAP
S2-12
GENERATE TEXTURE DATA FOR EACH TRIANGLE IN THE TEXTURE COORDINATE MAP TO GENERATE A TEXTURE MAP
S2-14
OUTPUT DATA
S2-16
END

GENERATING TEXTURE MAPS FOR USE IN 3D COMPUTER GRAPHICS

This application claims the right of priority under 35 USC § 119 based on British Patent Application number GB 0307652.8 filed 2 Apr. 2003, which is hereby incorporated by reference herein in its entirety as if fully set forth herein.

The present invention relates to the field of three-dimensional (3D) computer graphics, and more particularly to the generation of a texture map for use in rendering an image of a three-dimensional computer model.

The technique of texture mapping is well known in the field of 3D computer graphics. In this technique, an image (for example a digitised image recorded by a camera, a human-generated synthesised image, or a combination thereof) known as a "texture map" is stored and mapped on to one or more surfaces of a three-dimensional computer model during rendering to represent surface detail in the final image of the model. The texture map is made up of a two-dimensional matrix of individual elements known as "texels" (like the pixels of an image) and, typically, a respective red, green and blue value is stored for each texel to define the texture data in the texture map.

Coordinates defining a point in the texture map are assigned to each vertex of each polygon in the 3D computer model on to which texture data is to be mapped during rendering. In this way the assigned texture map coordinates for a polygon's vertices define a corresponding polygon in the texture map containing the texture data which is to be mapped on to the 3D model polygon during rendering.

Very often, it is necessary to texture map texture data onto every polygon in a 3D computer model (which may comprise 1,000s or 10,000s of polygons), and in many cases, the texture data for each polygon is different. Accordingly, since a respective polygon must be made available in the texture map to store the texture data for each polygon in the 3D model, and since the polygons in the texture map must be arranged to be non-overlapping, the size of the required texture map can be extremely large.

This problem is made worse because the polygons in the texture map must be separated by what is known as "padding". More particularly, when the value of an image pixel is to be calculated during rendering with a texture map, the pixel's corner points are mapped into the texture map to define a quadrilateral, and a value for the pixel is computed by summing all the texture data in all the texels which lie within the quadrilateral. However, a pixel intended to show the surface texture for part of a particular polygon in the 3D model may map to a quadrilateral in the texture map which extends outside the boundary of the polygon containing the texture data for the 3D computer model polygon. Therefore, to prevent pixels having incorrect values through the incorporation of texture data from incorrect polygons in the texture map, each polygon in the texture map is surrounded by "padding" in which texture data is defined based upon the texture data in the polygon, and which is sufficiently wide that a pixel intended to take texture data from the polygon is guaranteed to map to a quadrilateral in the texture map which does not extend outside the padding.

To address the problem of texture map size the polygons in the texture map are defined to have a size sufficiently small that the resulting texture map will meet the necessary size requirements.

However, as a result, the number of texels within each polygon (defining the area available within the polygon for texture data storage) is reduced to below that required to store all of the available texture data. Therefore, some of the texture data has to be discarded and only some of the texture data can be stored in the texture map. Consequently, when texture mapping is performed during rendering to map texture data onto the 3D computer model to generate image data, information from the originally available texture data has been lost and image quality is reduced.

The present invention aims to address at least one of the problems above.

According to the present invention, a plurality of first connected polygons and texture data therefor are processed to define a plurality of second connected polygons in a two-dimensional area to store the texture data. Each second polygon is defined such that polygons for storing more important texture data have a larger area than polygons for storing less important texture data.

In this way, when the texture data is stored in the second polygons, the quality of important texture data is preserved at the expense of less important texture data. This is because more area is allocated to the storage of important texture data and hence the amount of important texture data which is lost is less.

The determination of the importance of the texture data may be carried out automatically or in accordance with a user-definition.

The starting polygons may comprise, for example, a three-dimensional computer model for which a texture map is to be generated, or may comprise a texture map which is to be reduced in area.

The present invention also provides a computer program product, embodied for example as a storage medium carrying instructions or a signal carrying instructions, comprising instructions for causing a programmable processing apparatus to become operable to perform a method as set out above or to become configured as an apparatus as set out above.

Embodiments of the invention will now be described, by way of example only, with reference to the accompanying drawings, in which:

FIG. 1 schematically shows the components of an embodiment of the invention, together with the notional functional processing units and data stores into which the processing apparatus component may be thought of as being configured when programmed by programming instructions;

FIG. 2 shows the processing operations performed by the processing apparatus in FIG. 1;

FIRST EMBODIMENT

Figure 3:
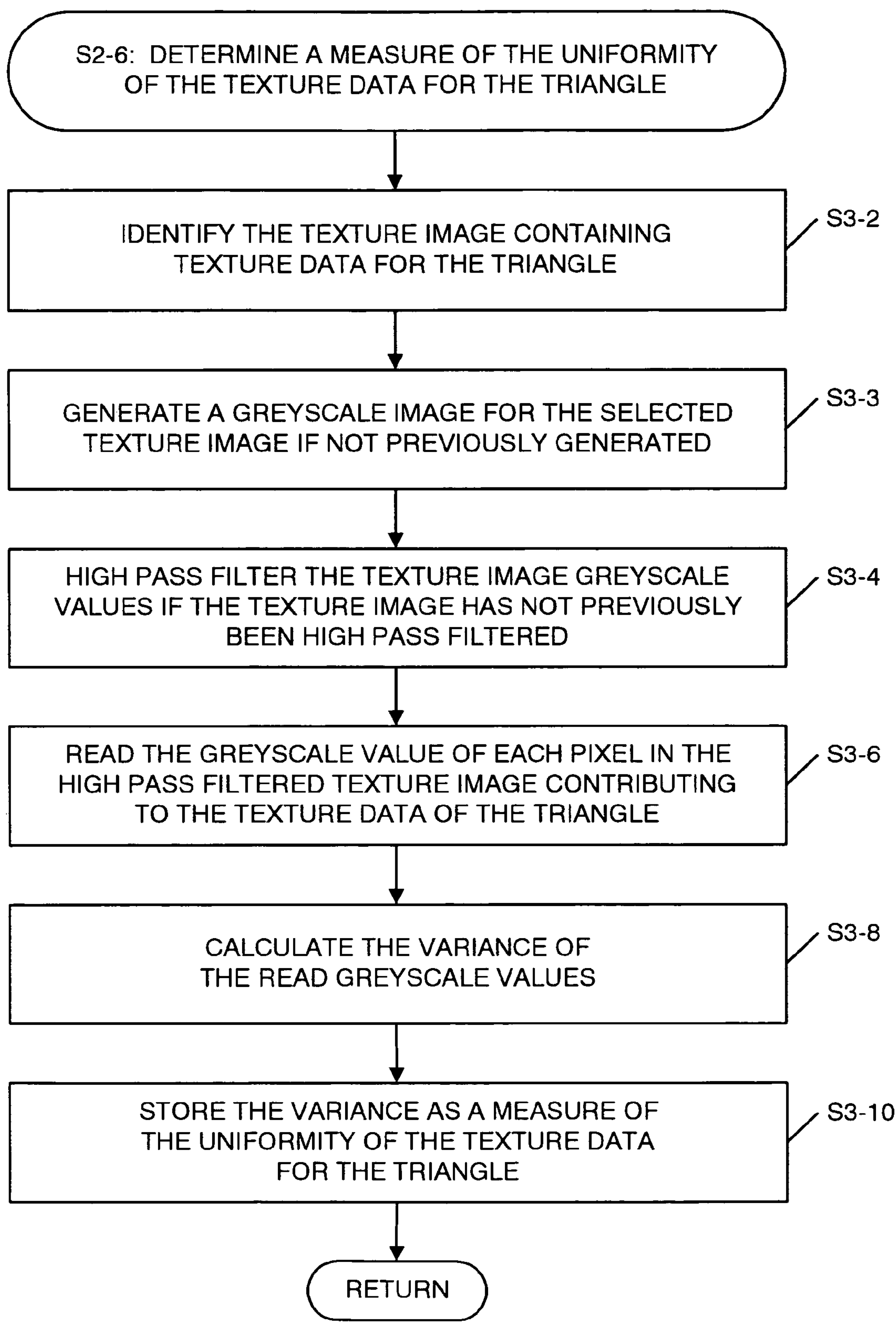
FIG. 3 shows the processing operations performed in the first embodiment at step S2-6 in FIG. 2.

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium 12 (such as an optical CD ROM, semiconductor ROM, or magnetic recording medium, etc), and/or as a signal 14 (for example an electrical or optical signal input to the processing apparatus 2, for example from a remote database, by transmission over a communication network such as the Internet or by transmission through the atmosphere), and/or entered by a user via a user input device 6 such as a keyboard.

As will be described in more detail below, the programming instructions comprise instructions to cause the processing apparatus 2 to become configured to process input data defining a three-dimensional computer model of the surface shape of a subject object and data defining a plurality of images of the subject object recorded at different positions and orientations, to generate data defining a texture map for use in rendering images of the three-dimensional computer model. The three-dimensional computer model comprises a triangle mesh representing the surface shape of the subject object, and the processing to generate the texture map comprises processing to define a respective triangle within a two-dimensional rectangle for each triangle in the triangle mesh and to define texture data for each triangle in the rectangle in dependence upon the image data in the input images. The processing is carried out in a way which defines the triangles in the two-dimensional rectangle so that the area of each triangle is dependent upon the importance of the content of texture data to be stored therein. More particularly, triangles required to store texture data with a relatively large amount of detail (and therefore a large information content) have a relatively large area and triangles which are required to store texture data with relatively little detail (and therefore a small information content) have a relatively small area. In this way, more area is allocated for the storage of detailed texture data, thereby reducing the amount of information which is lost from the texture data during the creation of a texture map.

When programmed by the programming instructions, processing apparatus 2 can be thought of as being configured as a number of functional units for performing processing operations and a number of data stores configured to store data. Examples of such functional units and data stores together with their interconnections are shown in FIG. 1. The functional units, data stores and interconnections illustrated in FIG. 1 are, however, notional, and are shown for illustration purposes only to assist understanding; they do not necessarily represent the units, data stores and connections into which the processors, memories etc of the processing apparatus 2 actually become configured.

Referring to the functional units shown in FIG. 1, a central controller 20 is arranged to process inputs from the user input devices 6, and also to provide control and processing for the other functional units. Working memory 30 is provided for use by central controller 20 and the other functional units.

Input data interface 40 is arranged to receive, and write to memory, input data input to the processing apparatus 2, for example as data stored on a storage medium 42 or carried by a signal 44 transmitted to the processing apparatus 2. In this embodiment, the input data comprises data defining a three-dimensional computer model comprising a triangle mesh representing the surface shape of a subject object, data defining texture data to be used to generate a texture map for the three-dimensional computer model, and data defining the required size of the texture map to be generated. In this embodiment, the input texture data to be used in the texture map comprises red (R), green (G) and blue (B) image data defining a plurality of images of the subject object recorded at different positions and orientations, together with data defining the positions and orientations of the camera input images relative to the triangle mesh representing the subject object, and data defining the values of the intrinsic parameters of the camera(s) which recorded the images—that is, the aspect ratio, focal length, principal point (the point at which the optical axis intersects the imaging plane), first order radial distortion coefficient, and skew angle (the angle between the axes of the pixel grid; because the axes may not be exactly orthogonal). The input camera images will be referred to as "texture images" because they contain the data available for processing to generate texture data for the three-dimensional computer model.

Triangle mesh store 50 is configured to store the input data defining the triangle mesh representing the surface shape of the subject object.

Input texture data store 60 is configured to store the input texture data (in this embodiment, image data defining the input images of the subject object, data defining the positions and orientations of the input images, and data defining the intrinsic parameter values of the camera(s)).

Texture coordinate map generator 70 is operable to process the input data to generate a texture coordinate map. The texture coordinate map comprises a two-dimensional (2D) rectangle (which may be a square) in which is defined a respective triangle for each triangle in the triangle mesh, to which input texture data can be allocated to generate a texture map for the triangle mesh.

Texture coordinate map generator 70 comprises texture uniformity tester 80, size calculator 84 and triangle packer 90.

Texture uniformity tester 80 is operable to process the input texture data to calculate a measure of the uniformity of the texture data available for each triangle in the triangle mesh. As will be explained below, the uniformity measure is a measure of the amount of detail in the texture data, and therefore the importance of the texture data.

Size calculator 84 is operable to define a size for each triangle in the triangle mesh defining the size of the corresponding triangle to be generated in the texture coordinate map. As will be explained below, size calculator 84 is operable to calculate the respective size of each triangle in dependence upon the uniformity of the texture data to be stored therein calculated by texture uniformity tester 80. More particularly, size calculator 84 is arranged to allocate more area to a triangle as the non-uniformity (and hence importance) of the texture data to be stored therein increases (because the more non-uniform the texture data is, the more detail and more information is available within the texture data).

Triangle list packer 90 is operable to define a triangle in the texture coordinate map rectangle for each triangle in the triangle mesh. Triangle list packer 90 is configured to define the triangles in the rectangle without any overlap and with the sizes defined by size calculator 84.

Texture coordinate map store 100 is configured to store data defining the texture coordinate map generated by texture coordinate map generator 70.

Texture data generator 110 is operable to process the data defining the texture coordinate map and the input texture data to generate texture data for the triangles in the texture coordinate map, thereby to generate a texture map. The texture map generated by texture data generator 110 comprises, in a conventional manner, R, G, B values assigned to the texels occupied by each triangle, so that, during rendering, the values can be texture mapped on to the corresponding triangle in the triangle mesh to generate a rendered colour image thereof.

Texture map store 120 is configured to store data defining the texture map generated by texture data generator 110.

Renderer 130, under the control of central controller 20, is operable to generate image data in a conventional way by rendering the input triangle mesh from a user-selected viewpoint and texture mapping texture data thereon in accordance with the texture map generated and stored in texture map store 120. Renderer 130 is further operable to output the generated image data to display device 4 for display to a user.

Output data interface 140 is operable to output data from processing apparatus 2 for example as data on a storage medium 142 (such as an optical CD ROM, semiconductor ROM or magnetic recording medium, etc) and/or as a signal 144 (for example an electrical or optical signal transmitted over a communication network such as an Internet or through the atmosphere). In this embodiment, the output data comprises data defining the texture map generated and stored in texture map store 120, and, optionally, data defining the input triangle mesh.

A recording of the output data may be made by recording the output signal 144 either directly or indirectly (for example by making a first recording as a "master" and then making a subsequent recording from the master or from a descendant recording thereof) using recording apparatus (not shown).

FIG. 2 shows the processing operations performed by processing apparatus 2 in this embodiment.

At step S2-2, input data interface 40, under the control of central controller 20, stores the input data defining the triangle mesh in triangle mesh store 50, and the input R, G, B colour image data defining the input images in the input texture data store 60, together with the input data defining the positions and orientations of the images and the data defining the intrinsic parameter values of the camera(s) which recorded the images. In addition, in this embodiment, the user inputs instructions (for example using a user input device 6 such as a keyboard) defining the size of the texture map to be generated. In this embodiment, the user defines the size by specifying the height and width of the texture map by number of texels. The data defining this size is stored in working memory 30.

At step S2-4, texture uniformity tester 80 selects the next triangle for processing from the triangle mesh representing the surface of the subject object stored at step S2-2 (this being the first triangle the first time step S2-4 is performed).

At step S2-6, texture uniformity tester 80 performs processing to calculate a measure of the uniformity of the texture data defined in the input data stored at step S2-2 for the triangle selected at step S2-4. The measure of uniformity is a measure of the importance of the texture data.

FIG. 3 shows the processing operations performed by texture uniformity tester 80 in the first embodiment at step S2-6.

Referring to FIG. 3, at step S3-2, texture uniformity tester 80 identifies the texture image stored at step S2-2 containing texture data for the triangle selected at step S2-4.

More particularly, in this embodiment, texture uniformity tester 80 performs processing in a conventional manner to identify the texture images from the input texture images which are front-facing to the selected triangle, to discard texture images therefrom which are occluded or partially occluded by other triangles in the mesh, and to select from the remaining texture images the texture image in which the selected triangle has the largest projected area.

At step S3-3, texture uniformity tester 80 processes the R, G, B texture image data for the texture image identified at step S3-2 to generate a greyscale (that is, intensity) image for the identified texture image.

More particularly, in this embodiment, texture uniformity tester 80 converts the R, G, B values for each texel in the identified texture image into an intensity value, I, in accordance with the following equation (the R, G, B values of the texture image being retained for future texture data generation):

$$I = \frac{|R| + |G| + |B|}{3} \tag{1}$$

Other greyscale image generation techniques could, of course, be used.

The processing at step S3-3 is omitted if a greyscale image has previously been generated for the identified texture image (which would be the case if the texture image had been processed for a previous triangle selected at step S2-4).

At step S3-4, texture uniformity tester 80 performs a high-pass filter operation on the greyscale image generated at step S3-3. However, this processing operation is omitted if the greyscale image has previously been high-pass filtered (which would be the case if the texture image had been processed for a previous triangle selected at step S2-4).

In this embodiment, the high-pass filter processing performed at step S3-4 comprises applying a Gaussian filter to the texture image intensity values in a conventional manner, subtracting the Gaussian-filtered image values from the original image intensity values, and then calculating the absolute values of the values resulting from the subtraction. This processing is equivalent to subtracting low-pass filtered image data from the original image data to generate high-pass filtered image data. In addition, this processing is equivalent to edge detection processing.

Other forms of high-pass filtering or edge detection could, of course, be performed at step S3-4 in addition to or instead of the processing described above.

At step S3-6, texture uniformity tester 80 reads the greyscale (intensity) value of each pixel in the high-pass filtered texture image contributing to the texture data of the currently selected triangle.

More particularly, texture uniformity tester 80 projects the selected triangle into the texture image identified at step S3-2, with the result that the vertices of the projected triangle define a triangle within the texture image. Each pixel lying at least partially within the triangle in the texture image is identified as a pixel contributing to the texture data of the triangle, and the greyscale values of the identified pixels are read.

At step S3-8, texture uniformity tester 80 calculates a measure of the extent of the differences in the greyscale values read at step S3-6. More particularly, in this embodiment, texture uniformity tester 80 calculates the variance of the greyscale values read at step S3-6 in accordance with the following equation:

$$\text{variance} = \frac{1}{N}\sum_{i=1}^{N}[f(i) - f_{mean}]^2 \quad (2)$$

where:

N is the number of greyscale values read at step S3-6 f(i) is the "i"th greyscale value $$f_{mean} = \frac{1}{N}\sum_{i=1}^{N} f(i)$$

At step S3-10, texture uniformity tester 80 stores the calculated variance as a measure of the uniformity of the texture data for the triangle currently being processed.

Referring again to FIG. 2, at step S2-8, texture uniformity tester 80 determines whether there is another triangle in the 3D computer model remaining to be processed. Steps S2-4 to S2-8 are repeated until each triangle in the 3D computer model has been processed in the way described above.

At step S2-10, size calculator 84 performs processing to define a respective "packing" size for each triangle in the 3D computer model. The packing size for each triangle defines the size the corresponding triangle will have in the texture coordinate map, and therefore defines the area of the texture coordinate map that will be available to store the texture data for the triangle in the 3D computer model. As will be explained below, the "packing" size for each triangle in the 3D computer model is calculated in dependence upon the uniformity measure of the texture data for the triangle determined at step S2-6.

Figure 4:
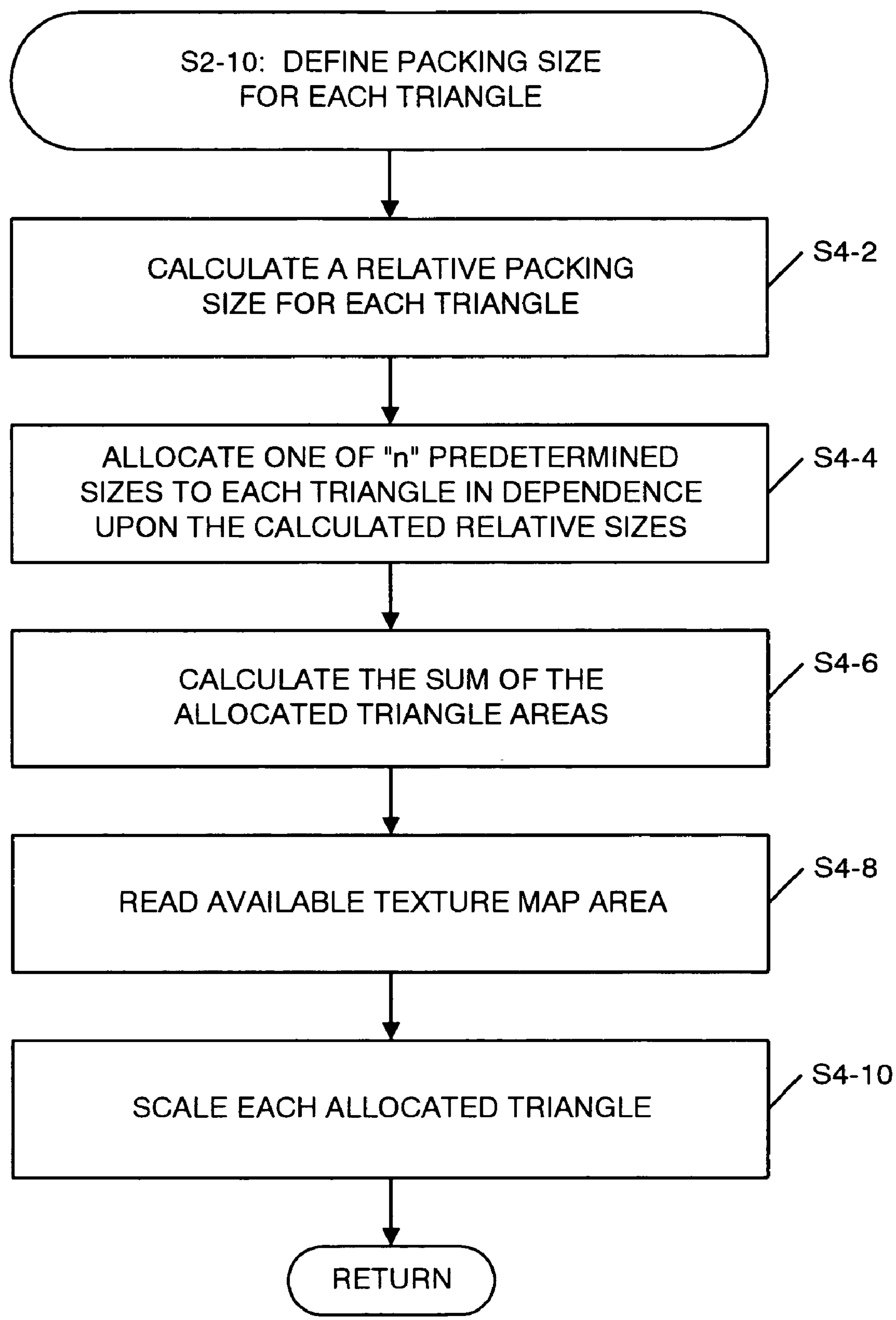
FIG. 4 shows the processing operations performed at step S2-10 in FIG. 2.

FIG. 4 shows the processing operations performed by size calculator 84 at step S2-10.

Referring to FIG. 4, at step S4-2, size calculator 84 calculates a relative packing size for each triangle in the 3D computer model. To do this, in this embodiment, size calculator 84 first calculates a size, $S_i$, for each triangle in accordance with the following equation:

$$S_i = A_i \times U_i \quad (3)$$

where:

$A_i$ is the area of the "i"th triangle in the 3D computer model (measured in world units$^2$);

$U_i$ is the uniformity measure for the "i"th triangle calculated at step S2-6.

Size calculator 84 then divides each calculated size $S_i$ by the largest calculated size (that is, the largest value of S).

At step S4-4, size calculator 84 quantises the relative sizes calculated at step S4-2 by allocating one of a predetermined number of sizes to each triangle in dependence upon the relative size calculated for the triangle at step S4-2.

"Generating a Texture Map from Object-Surface Texture Data" by M Maruya in EUROGRAPHICS '95, Volume 14, 1995, Nov. 3, pages C397 to C405 discloses a method of generating a texture map containing a respective triangle of texture data for each triangle in a 3D computer model. Each triangle of the 3D computer model is transformed into a right-angled triangle having one of four different sizes, namely a "standard" (or full) size, a ½ size (made by dividing the standard size triangle down the middle into two triangles of the same properties as the standard-size triangle and exactly half the area), a ¼ size, and a ⅛ size (each of the ¼ size and ⅛ size triangles similarly being the half-size of the triangle size preceding it). Each triangle is composed of two regions: an internal triangle to which a triangle from the 3D mesh is transformed and an auxiliary area of padding (one or two texels in width).

Size calculator 84 uses a similar technique at step S4-4, but size calculator 84 allocates a triangle size for each triangle in the 3D computer model in dependence upon the relative size for the triangle calculated at step S4-2. More particularly, size calculator 84 allocates one of the four right-angled triangle sizes to each triangle in the 3D computer model in accordance with the following criteria:

if the calculated relative size $\geqq 0.5$, then allocate a full size triangle;

if the calculated relative size is between 0.25 and 0.5, then allocate a ½ size triangle;

if the calculated relative size is between 0.125 and 0.25, then allocate a ¼ size triangle;

if the calculated relative size is size $\leqq 0.125$, then allocate a ⅛ size triangle.

At step S4-6, size calculator 84 calculates the sum of the areas of all of the triangles allocated at step S4-4.

At step S4-8, size calculator 84 reads the area of the texture map to be generated (this being defined in the input data stored at step S2-2 in this embodiment).

At step S4-10, size calculator 84 scales each triangle allocated at step S4-4 by the ratio of the total triangle area calculated at step S4-6 to the available texture map area read at step S4-8. In this way, the total of the triangle areas is scaled to fit within the available texture map area.

Referring again to FIG. 2, at step S2-12, triangle packer 90 performs processing to arrange the scaled triangles generated at step S4-10 within a two-dimensional rectangle so as to generate a texture coordinate map.

In this embodiment, triangle packer 90 performs the processing at step S2-12 in the way described in "Generating a Texture Map from Object-Surface Texture Data" by M Maruya in EUROGRAPHICS '95, Volume 14, 1995, Nov. 3, pages C397 to C405. More particularly, pairs of triangles of the same size are first combined to form next-larger size blocks. This combination process is repeated until the number of blocks in any one size other than the standard-size is no more than one. This will result in a number of standard-size blocks and the remaining ½ size and smaller blocks. Next, the remaining blocks are combined so as to fit into one standard-size block. Finally, the standard-size blocks are arranged within a rectangle in a two-dimensional plane.

As a result of this processing, a texture coordinate map is generated comprising a rectangle (which may be a square) in which is defined a respective triangle for each triangle in the triangle mesh of the 3D computer model stored at step 2-2. Each triangle in the texture coordinate map has straight sides, and has a different size and shape to the corresponding triangle in the 3D computer model. In addition, the connectivity of the triangles in the texture coordinate map (that is, how the triangles are positioned and connect to each other) is different to the connectivity of the triangles in the 3D computer model.

It should be noted that the scaling of triangles performed at steps S4-6 to S4-10 assumes that the triangles will be packed into the two-dimensional rectangle at step S2-12 with one hundred percent efficiency. However, in practice, the packing efficiency is often less than this, resulting in a texture coordinate map being generated at step S2-12 which is larger than the required size defined in the input data stored at step S2-2.

To address this problem, steps S4-10 and S2-12 may be repeated one or more times with the triangles being scaled at step S4-10 by the ratio of the required texture map area to the area of the texture map generated on the previous iteration of step S2-12. In this way, the triangles will be scaled until a texture map is generated at step S2-12 having area less than or equal to the required texture map area.

At step S2-14, texture data generator 110 generates R, G, B texture data for each triangle in the texture coordinate map by processing the data in the input R, G, B texture images.

More particularly, the texture data within a texture image available for each triangle in the texture coordinate map is defined as a result of the processing at step S2-6 (in which a texture image was identified for each triangle in the 3D computer model and each triangle was projected into the texture image to define a projected triangle, with the texture data for the triangle being the texture data lying within the projected triangle). At step S2-14, texture data generator 110 generates texture data for each triangle in the texture coordinate map. This processing must take into account the smaller area of the triangle in the texture coordinate map compared to the triangle in the texture image (with the result that the amount of texture data needs to be reduced) and any difference in the shape of the triangle in the texture coordinate map compared to the triangle in the texture map.

In this embodiment, the processing is performed using a conventional texture mapping operation, defining the texture image to be the texture map and the texture coordinate map to be an image. More particularly, a conventional open GL texture mapping routine is performed, defining the triangle vertices in the texture coordinate map to be the recipient polygon for the transformed texture data. However, other methods of generating the texture data for a triangle in the texture coordinate map using the texture data available in an input texture image could be used instead.

The result of the processing at step S2-14 is a texture map comprising a two-dimensional rectangle having therein a respective triangle for each triangle in the 3D computer model and R, G, B texture data for each triangle.

At step S2-16, central controller 20 controls output data interface 140 to output data defining the generated texture map and, optionally, the input data defining the 3D computer model stored at step S2-2. The output data may be output for example as data stored on a storage medium 142 or as data carried by a signal 144.

SECOND EMBODIMENT

A second embodiment of the present invention will now be described.

The components of the second embodiment and the processing operations performed thereby are the same as those in the first embodiment, with the exception of the processing operations performed by texture uniformity tester 80 at step S2-6. Accordingly, only these differences will be described here.

Figure 5:
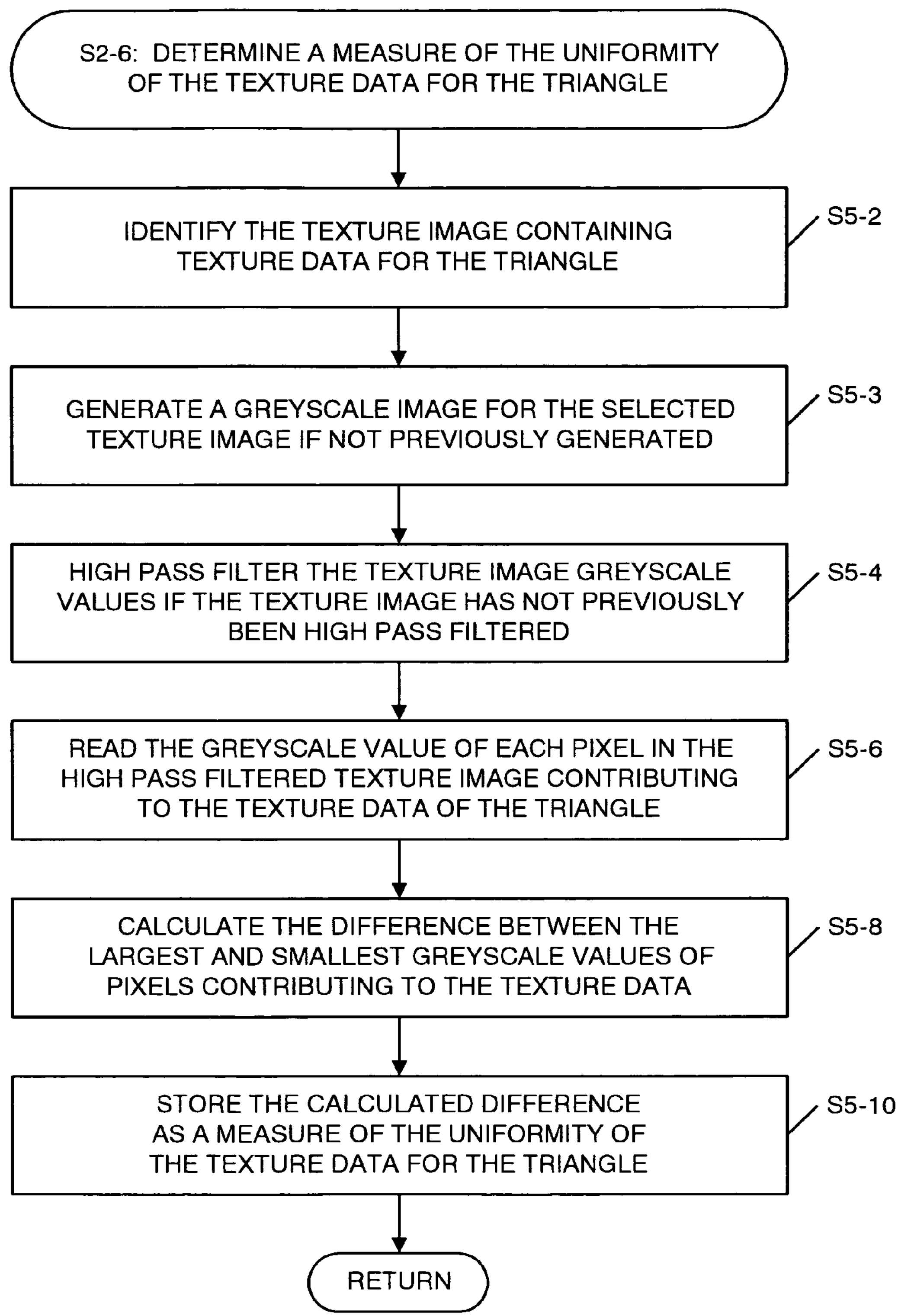
FIG. 5 shows the processing operations performed in the second embodiment at step S2-6 in FIG. 2.

FIG. 5 shows the processing operations performed by texture uniformity tester 80 in the second embodiment at step S2-6.

Referring to FIG. 5, the processing at steps S5-2 to S5-6 is the same as the processing at steps S3-2 to S3-6 in the first embodiment. Accordingly, because this processing has been described above, it will not be described again here.

At step S5-8, to calculate a measure of the extent of the differences in the greyscale values read at step S5-6, texture uniformity tester 80 subtracts the smallest greyscale value read at step S5-6 from the largest greyscale value read at step S5-6 to calculate the maximum difference between the greyscale values of pixels contributing to the texture data (that is, the range of the greyscale values).

At step S5-10, texture uniformity tester 80 stores the calculated maximum difference as a measure of the uniformity of the texture data for the triangle.

THIRD EMBODIMENT

A third embodiment of the present invention will now be described.

The components of the third embodiment and the processing operations performed thereby are the same as those in the first embodiment, with the exception of the processing operations performed by texture uniformity tester 80 at step S2-6. Accordingly, only these differences will be described here.

Figure 6:
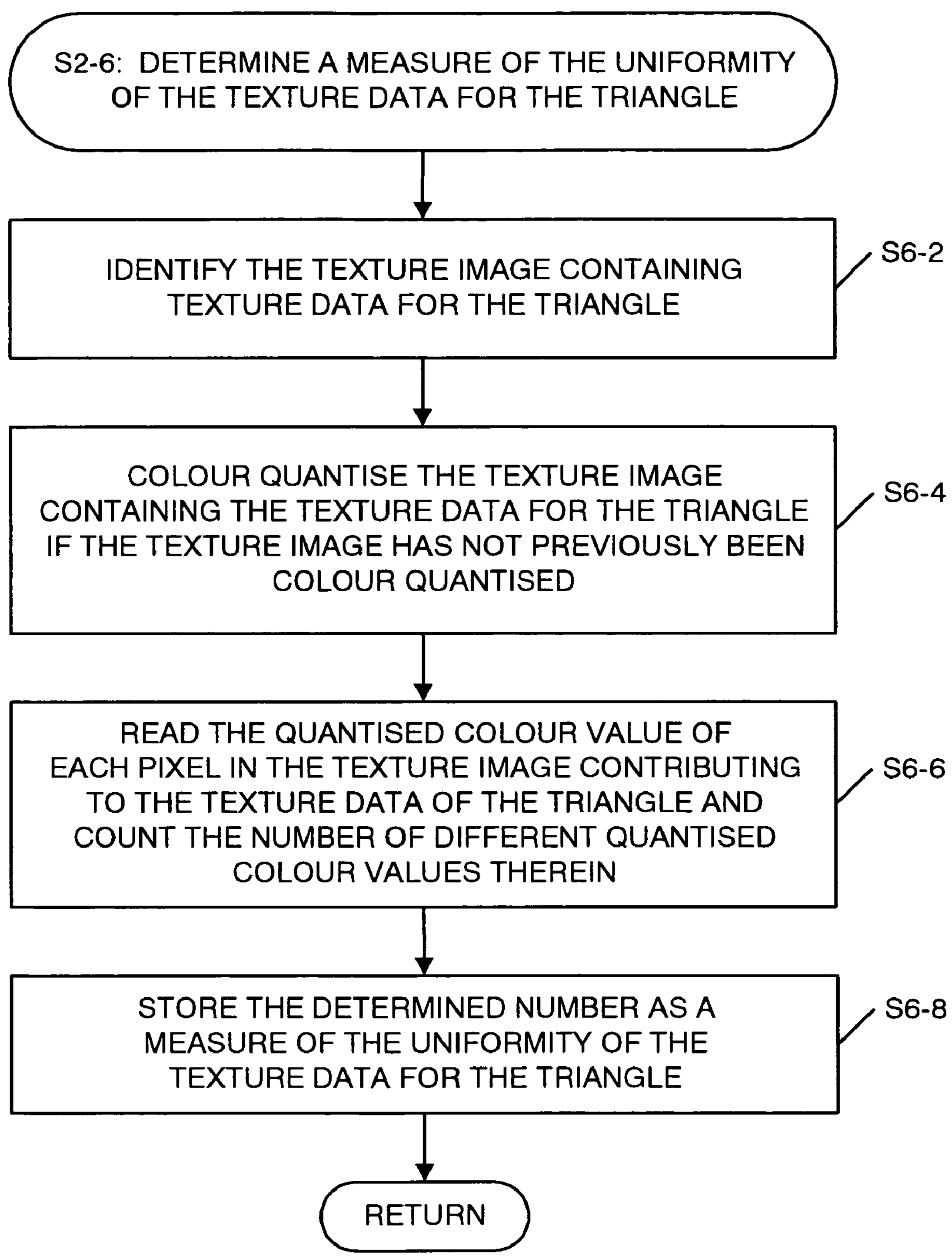
FIG. 6 shows the processing operations performed in the third embodiment at step S2-6 in FIG. 2.

FIG. 6 shows the processing operations performed by texture uniformity tester 80 in the third embodiment at step S2-6.

Referring to FIG. 6, the processing performed at step S6-2 is the same as that performed at step S3-2 in the first embodiment, and accordingly will not be described again here.

At step S6-4, texture uniformity tester 80 performs colour quantisation processing of the R, G and B texture data values in the texture data image identified in step S6-2. This processing is omitted if it has previously been performed as part of the processing for a different triangle in the 3D computer model.

In this embodiment, the processing at step S6-4 is carried out by reading the R, G and B values of each pixel in the texture image, and replacing them with an integer index value selected from 256 possible index values in dependence upon the RGB triple. This processing is performed in a conventional way, for example as described in "Digital Image Processing", Second Edition by William K Pratt, John Wiley & Sons Inc, ISBN 0-471-85766-1, section 6.4.2, pages 163-167.

At step S6-6, texture uniformity tester 80 reads the quantised colour value of each pixel in the texture image which contributes to the texture data of the triangle currently being processed (these pixels comprising each pixel lying at least partially within the projection in the texture image of the triangle from the 3D computer model currently being processed). Also at step S6-6, texture uniformity tester 80 counts the number of different respective quantised colour values within the pixels contributing to the texture data of the triangle.

At step S6-8, texture uniformity tester 80 stores the number of different colour values determined at step S6-6 as a measure of the uniformity of the texture data for the triangle.

FOURTH EMBODIMENT

A fourth embodiment of the present invention will now be described.

The components of the fourth embodiment and the processing operations performed thereby are the same as those in the first embodiment, with the exception of the processing operations performed by texture uniformity tester 80 at step S2-6. Accordingly, only these differences will be described here.

Figure 7:
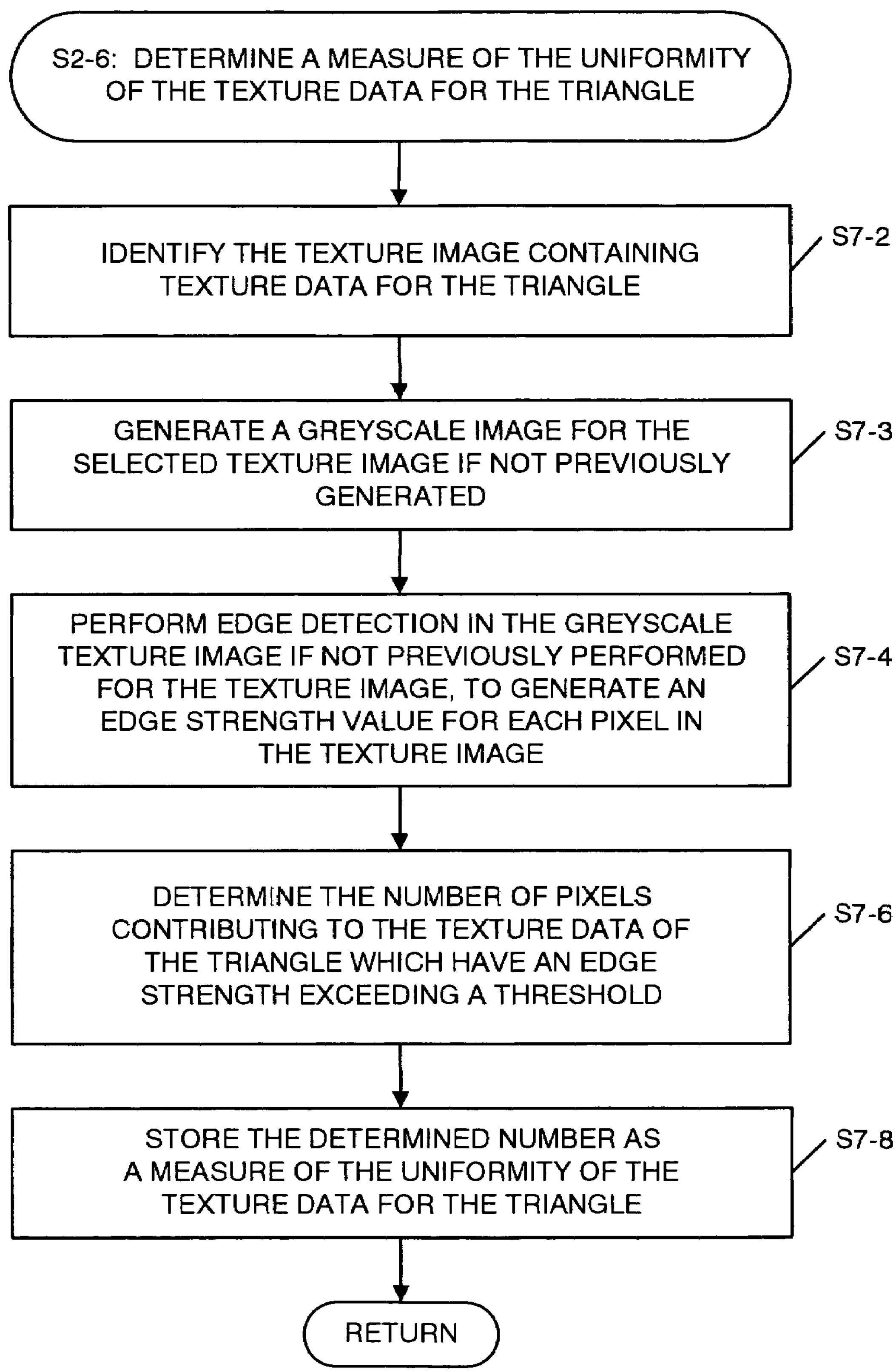
FIG. 7 shows the processing operations performed in the fourth embodiment at step S2-6 in FIG. 2.

FIG. 7 shows the processing operations performed by texture uniformity tester 80 in the fourth embodiment at step S2-6.

Referring to FIG. 7, the processing performed at steps S7-2 and S7-3 is the same as that performed at steps S3-2 and S3-3 in the first embodiment, and accordingly will not be described again here.

At step S7-4, texture uniformity tester 80 performs edge detection on the greyscale image data generated at step S7-3, to generate an edge strength value for each pixel in the texture image. This processing is omitted if edge detection has already been performed for the texture image as a result of the processing for a previous triangle in the 3D computer model.

In this embodiment, the edge detection at step S7-4 is performed in a conventional way, for example using a Sobel operator or Roberts operator as described in Chapters 5.2.1 and 5.2.2 of "Machine Vision" by Jain et al, published by McGraw-Hill Inc, ISBN 0-07-113407-7. Other edge detection methods could be used instead.

At step S7-6, texture uniformity tester 80 determines the pixels within the texture image which contribute to the texture data of the triangle currently being processed (that is, the pixels lying at least partially inside the projection in the texture image of the triangle from the 3D computer model) and determines the number of these pixels which have an edge strength calculated at step S7-4 exceeding a threshold. In this embodiment, the threshold is set to 20 grey levels although different thresholds may be set.

At step S7-8, texture uniformity tester 80 stores the number of pixels determined at step S7-6 as a measure of the uniformity of the texture data for the triangle.

FIFTH EMBODIMENT

A fifth embodiment of the present invention will now be described.

In the embodiments described above, texture uniformity tester 80 performs processing at step S2-6 without operator input to determine a measure of the importance of the texture data for each triangle in the 3D computer model, this being the measure of the uniformity of the texture data for each triangle.

However, in the fifth embodiment, texture uniformity tester 80 is replaced by a texture importance value allocator, which determines a respective measure of the importance of the texture data of each triangle in the 3D computer model in dependence upon inputs from a user defining the relative importances of the triangles in the 3D computer model.

More particularly, in the fifth embodiment, the processing at steps S2-4 to S2-8 in FIG. 2 is replaced by processing to display images to the user on display device 4 showing the input 3D computer model from user-selected viewing positions and directions. Each displayed image shows the 3D computer model rendered with texture data from the input images. The texture data for rendering each triangle is identified by determining the input texture image which is non-occluded and front-facing to the selected triangle and in which the selected triangle has the largest projected area (using the same processing as that described above at step S3-2 in the first embodiment) and projecting the vertices of the triangle from the 3D computer model to be rendered into the identified texture image to define vertices of a triangle containing the texture data for rendering.

The user then inputs signals (for example using a keyboard and/or a mouse etc) defining the importance of the texture data in each triangle in the 3D computer model. This is done, for example, by drawing around areas of each displayed image and tagging each area with a relative importance. The tag may comprise a numerical value defined for each area or may comprise a colour, etc which the user "paints" on to the area.

In accordance with the signals received from the user, the texture importance value allocator in the fifth embodiment determines the triangles in the 3D computer model to which each user-defined importance relates (that is, the triangles in the area for which the importance tag is defined), and defines a respective numerical importance value for each triangle in the 3D computer model for use in subsequent processing.

As a modification, the automatic texture importance calculation technique performed by texture uniformity tester 80 in any of the first to fourth embodiments described above may be combined with the user-defined importance technique of the fifth embodiment. This may be done by combining the uniformity measure automatically calculated at step S2-6 with the measure determined in the fifth embodiment in accordance with user-input signals to generate a respective combined importance measure for each triangle in the 3D computer model.

Modification and Variations

Many modifications and variations can be made to the embodiments described above within the scope of the claims.

For example, in the first and second embodiments, the processing at steps S3-4 and S5-4 may be omitted.

In the first and second embodiments, greyscale images are generated at steps S3-3 and S5-3, and greyscale values are read and processed at steps S3-6 and S3-8, and steps S5-6 and S5-8. However, instead, R, G and B values (or other colour component values) may be read and processed. More particularly, the R, G and B values of the pixels may be read at step S3-6 and step S5-6, a variance of the red values, a variance of the green values, and a variance of the blue values may be calculated at step S3-8 and step S5-8, and the sum, average or other combination of the three respective variances may be calculated and stored at step S3-10 and step S5-10 as a measure of the uniformity of the texture data for the triangle.

In the embodiments described above, the input texture images comprise images of the subject object recorded by a camera together with data defining the positions and orientations of the images relative to the input 3D computer model and data defining the intrinsic camera parameter values. However, in addition or instead, the input texture data may comprise one or more pre-generated conventional texture maps. In this case, the processing in the first to fourth embodiments at steps S3-2, S5-2, S6-2 and S7-2 to identify the texture image containing texture data for the triangle merely comprises reading the data defining the pointer from the triangle to the relevant texture map.

In the embodiments described above, the input data comprises a 3D computer model of the subject object and texture data therefor. However, instead, the input data may comprise a pre-generated texture map which is to be processed to reduce the size of the texture map. Alternatively, the input data may comprise two or more pre-generated texture maps which are to be combined into a single texture map. In either case, the processing in the first to fourth embodiments at step S2-4 selects the next triangle in the input texture map(s), the processing at step S2-6 comprises processing to determine the uniformity of the texture data within the selected triangle, and the processing at steps S2-10 and S2-12 comprises processing to define a new triangle (with a different shape and size) for each triangle in the input texture map(s) and to arrange the new triangles in a new rectangle (of smaller size than the input texture map(s)) to generate a texture coordinate map (with the connectivity of the triangles in the texture coordinate map being different to the connectivity of the triangles in the input texture map(s)). Similarly, the processing at step S2-14 to generate texture data for a triangle in the new texture coordinate map comprises processing the texture data from the corresponding triangle in the original input texture map. In the case of the fifth embodiment, each input texture map would be displayed to the user so that the user could designate areas thereof and define the importance of each area. The processing in the fifth embodiment at steps S2-10 to S2-14 would proceed as described above.

In the first to fourth embodiments described above, the processing performed at steps S3-2, S5-2, S6-2 and S7-2 identifies a single texture image containing texture data for the triangle. However, there may be more than one texture image containing texture data which is to be combined to generate texture data for a given triangle. In this case, processing may proceed by combining the texture data from the different texture images to generate the combined data in the form that it is to be applied to the triangle and then processing the combined data in the way described in the embodiments above. For example, the image data from the input images may be combined to generate six "canonical" texture maps, each texture map comprising texture data for a view of the 3D computer model from a respective one of the six faces of a cuboid containing the 3D computer model. Such processing is described, for example, in EP-A-1,204, 073. Alternatively, referring to the first embodiment by way of example, the texture data from each texture image contributing texture data to the given triangle may be processed separately using the processing at steps S3-2 to S3-8, and then the variances calculated at step S3-8 for the respective texture images may be combined (for example by calculating the sum or an average) to generate a measure of the uniformity of the texture data. In this case, the processing at step S2-14 to generate texture data for a triangle in the texture coordinate map would comprise processing the texture data from the different texture images to combine the texture data in the required way. Corresponding processing could be performed in the second, third and fourth embodiments.

In the first and second embodiments, the processing at steps S3-4 to S3-8 and steps S5-4 to S5-8 may be replaced with processing to apply a Fourier transform or discrete cosine transform (DCT) to the texture image to transform the texture data into the frequency domain and then to determine the uniformity measure in dependence upon the frequencies in the frequency domain, for example by selecting the highest frequency component that has a value larger than a predetermined threshold as the uniformity measure of the texture data for the triangle.

The processing to perform high-pass filtering at steps S3-4 and S5-4 in the first and second embodiments, the processing to perform colour quantisation at step S6-4 in the third embodiment and/or the processing to perform edge detection at step S7-4 in the fourth embodiment may be performed as a pre-process for every texture image after step S2-2 and before step S2-4. Similarly, the processing to generate greyscale images at steps S3-3, S5-3 and S7-3 in the first, second and fourth embodiments may be performed as a pre-process, for example between steps S2-2 and S2-4.

In the processing at step S2-10 and step S2-12 of the embodiments described above, right-angled triangles are defined and packed into a two-dimensional rectangle to generate the texture coordinate map. However, instead, the technique described in the proprietor's co-pending U.S. patent application Ser. No. 10/685,606 (the full contents of which are incorporated herein by cross-reference) may be used. In this case, the triangles defined at step S2-10 need not be right-angled triangles and the processing at step S4-4 need not be restricted to the allocation of one of a predetermined number of sizes.

In the fourth embodiment described above, step S7-3 may be omitted, and the edge detection processing at step S7-4 may be performed on the R, G, B texture image data (instead of on greyscale data as in the fourth embodiment). For example, edge detection may be performed three times—once for each of the R, G and B images.

In some computer graphics systems, the triangles in the three-dimensional computer model are grouped together to form a polygon, for example comprising a tristrip or quadrilateral (quad), etc. Processing is then performed on the polygon group, for example rendering processing. To accommodate such systems, an importance measure may be calculated at step S2-6 in the embodiments described above for each polygon defined for the 3D computer model, a packing size may be defined for each polygon at step S2-10, the polygons may be packed into the two-dimensional rectangle to generate a texture coordinate map at step S2-12 and texture data may be generated for each of the polygons at step S2-14 to generate a texture map.

In the embodiments described above, texture data generator 110 and texture map store 120 are part of processing apparatus 2. However, instead, texture data generator 110 and texture map store 120 may be provided as part of a separate apparatus. In this case, the output data output by data interface 140 comprises data defining the texture coordinate map generated by texture coordinate map generator 70 and, optionally, data defining the input texture data.

In the embodiments described above, processing is performed by a programmable computer using processing routines defined by programming instructions. However, some, or all, of the processing could, of course, be performed using hardware.

Other modifications are, of course, possible.

The invention claimed is:

1. A method of processing data defining a plurality of first polygons and texture data therefor, to generate data defining a texture map, the method comprising:

determining a respective measure of the uniformity of the texture data for each first polygon;

defining a respective second polygon in a two-dimensional area for each first polygon to store texture data therefrom, such that each second polygon is defined with an area dependent upon the measure of the uniformity of the texture data determined for the corresponding first polygon and such that the area increases as the uniformity of the texture data to be stored therein decreases; and generating texture data for the second polygons in dependence upon the texture data for the first polygons.

2. A method according to claim 1, wherein the processing to determine a measure of the uniformity of the texture data for a first polygon comprises processing the texture data to determine the measure in dependence upon the content of the texture data.

3. A method according to claim 2, wherein each measure of the uniformity of the texture data for a first polygon is determined in dependence upon color component values of the texture data.

4. A method according to claim 2, wherein each measure of the uniformity of the texture data for a first polygon is determined in dependence upon greyscale values of the texture data.

5. A method according to claim 2, wherein each measure of the uniformity of the texture data for a first polygon is determined by calculating a measure of an extent of differences in values of the texture data.

6. A method according to claim 5, wherein the texture data is filtered and a measure of the extent of differences in the filtered texture data values is calculated.

7. A method according to claim 2, wherein each measure of the uniformity of the texture data for a first polygon is determined in dependence upon the number of colors in the texture data.

8. A method according to claim 2, wherein each measure of the uniformity of the texture data for a first polygon is determined in dependence upon edges in the texture data.

9. A method according to claim 1, wherein the processing to determine a measure of the uniformity of the texture data for each first polygon comprises processing user input signals conveying a uniformity measure for each of at least some of the first polygons.

10. A method according to claim 1, wherein the second polygons are defined in the two-dimensional area such that the connectivity of the second polygons is different to the connectivity of the first polygons.

11. A method according to claim 1, wherein the first polygons and second polygons comprise triangles.

12. A method according to claim 1, wherein the first polygons and second polygons comprise groups of triangles.

13. A method according to claim 1, further comprising generating a signal carrying data defining the generated texture map.

14. A method according to claim 1, further comprising making a recording either directly or indirectly of data defining the generated texture map.

15. A method of processing data defining a three-dimensional computer model comprising a mesh of polygons and texture data therefor, to generate data defining a texture coordinate map, the method comprising:

determining, for each of at least some of the polygons in the three-dimensional computer model, a respective measure of the storage area to be allocated in the texture coordinate map to the texture data for the polygon such that a relatively large storage area is allocated for texture data with a relatively low level of uniformity and a relatively small storage area is allocated for texture data with a relatively high level of uniformity; and generating a texture coordinate map by defining a respective polygon in a two-dimensional area for each of the at least some polygons in the three-dimensional computer model to store texture data therefor, such that each polygon is defined with an area dependent upon the storage area measure determined for the corresponding polygon from the three-dimensional computer model.

16. A method of processing data defining a first texture map comprising a plurality of first polygons and texture data therefor in a first two-dimensional area, to generate data defining a texture coordinate map for a second texture map of smaller area than the first texture map, the method comprising:

determining, for each of at least some of the polygons in the first texture map, a respective measure of the storage area to be allocated to the texture data for the polygon in the second texture map such that a relatively large storage area is allocated for texture data with a relatively low level of uniformity and a relatively small storage area is allocated for texture data with a relatively high level of uniformity; and generating a texture coordinate map by defining a respective second polygon in a second two-dimensional area for each of the at least some of the first polygons, such that the area of the second two-dimensional area is less than the area of the first two-dimensional area, and such that each second polygon is defined with an area dependent upon the storage area measure determined for the corresponding first polygon.

17. A storage medium storing computer program instructions for programming a programmable processing apparatus to become operable to perform a method in accordance with any one of claims 1, 2 and 3 to 16.

18. A physically-embodied computer program product including computer program instructions in computer-readable form, including computer program instructions for programming a programmable processing apparatus to become operable to perform a method in accordance with any one of claims 1, 2 and 4 to 16.

19. A method according to claim 15 or claim 16, further comprising generating texture data for each polygon in the texture coordinate map from the texture data of the corresponding starting polygon.

20. A method according to claim 15 or claim 16, further comprising generating a signal carrying data defining the generated texture coordinate map.

21. A method according to claim 15 or claim 16, further comprising making a recording either directly or indirectly of data defining the generated texture coordinate map.

22. An apparatus for processing data defining a plurality of first polygons and texture data therefor, to generate data defining a texture map, the apparatus comprising:

a uniformity measure generator operable to determine a respective measure of the uniformity of the texture data for each first polygon;

a polygon definer operable to define a respective second polygon in a two-dimensional area for each first polygon to store texture data therefrom, such that each second polygon is defined with an area dependent upon the measure of the uniformity of the texture data determined by the uniformity measure generator for the corresponding first polygon and such that the area increases as the uniformity of the texture data to be stored therein decreases; and a texture data generator operable to generate texture data for the second polygons in dependence upon the texture data for the first polygons.

23. An apparatus according to claim 22, wherein the uniformity measure generator is operable to process the texture data to determine each uniformity measure in dependence upon the content of the texture data.

24. An apparatus according to claim 23, wherein the uniformity measure generator is operable to determine each measure of the uniformity of the texture data for a first polygon in dependence upon color component values of the texture data.

25. An apparatus according to claim 23, wherein the uniformity measure generator is operable to determine each measure of the uniformity of the texture data for a first polygon in dependence upon greyscale values of the texture data.

26. An apparatus according to claim 23, wherein the uniformity measure generator is operable to determine each measure of the uniformity of the texture data for a first polygon by calculating a measure of an extent of differences in values of the texture data.

27. An apparatus according to claim 26, wherein the uniformity measure generator is operable to filter the texture data and to calculate a measure of the extent of differences in the filtered texture data values.

28. An apparatus according to claim 23, wherein the uniformity measure generator is operable to determine each measure of the uniformity of the texture data for a first polygon in dependence upon the number of colors in the texture data.

29. An apparatus according to claim 23, wherein the uniformity measure generator is operable to determine each measure of the uniformity of the texture data for a first polygon in dependence upon edges in the texture data.

30. An apparatus according to claim 22, wherein the uniformity measure generator is operable to determine a measure of the uniformity of the texture data for each first polygon by processing user input signals conveying a measure of uniformity for each of at least some of the first polygons.

31. An apparatus according to claim 22, wherein the polygon definer is operable to define the second polygons in the two-dimensional area such that the connectivity of the second polygons is different from the connectivity of the first polygons.

32. An apparatus according to claim 22, wherein the first polygons and second polygons comprise triangles.

33. An apparatus according to claim 22, wherein the first polygons and second polygons comprise groups of triangles.

34. An apparatus for processing data defining a three-dimensional computer model comprising a mesh of polygons and texture data therefor, to generate data defining a texture coordinate map, the apparatus comprising:

a storage area calculator operable to determine, for each of at least some of the polygons in the three-dimensional computer model, a respective measure of the storage area to be allocated in the texture coordinate map to the texture data for the polygon, the storage area calculator being arranged to allocate a relatively large storage area for texture data with a relatively low level of uniformity and a relatively small storage area for texture data with a relatively high level of uniformity; and a polygon definer operable to generate a texture coordinate map by defining a respective polygon in a two-dimensional area for each of the at least some polygons in the three-dimensional computer model to store texture data therefor, such that each polygon is defined with an area dependent upon the storage area measure determined for the corresponding polygon from the three-dimensional computer model.

35. An apparatus for processing data defining a first texture map comprising a plurality of first polygons and texture data therefor in a first two-dimensional area, to generate data defining a texture coordinate map for a second texture map of smaller area than the first texture map, the apparatus comprising:

a storage area calculator operable to determine, for each of at least some of the first polygons in the first texture map, a respective measure of the storage area to be allocated to the texture data for a polygon in the second texture map, the storage area calculator being arranged to allocate a relatively large storage area for texture data with a relatively low level of uniformity and a relatively small storage area for texture data with a relatively high level of uniformity; and a polygon definer operable to generate a texture coordinate map by defining a respective second polygon in a second two-dimensional area for each of the at least some first polygons, such that the area of the second two-dimensional area is less than the area of the first two-dimensional area, and such that each second polygon is defined with an area dependent upon the storage area measure determined for the corresponding first polygon.

36. An apparatus according to claim 30 or claim 31, further comprising a texture data generator operable to generate texture data for each polygon in the texture coordinate map from the texture data of the corresponding starting polygon.

37. An apparatus for processing data defining a plurality of first polygons and texture data therefor, to generate data defining a texture map, the apparatus comprising:

uniformity measure generating means for determining a respective measure of the uniformity of the texture data for each first polygon;

means for defining a respective second polygon in a two-dimensional area for each first polygon to store texture data therefrom, such that each second polygon is defined with an area dependent upon the measure of the uniformity of the texture data determined by the uniformity measure generating means for the corresponding first polygon and such that the area increases as the uniformity of the texture data to be stored therein increases; and means for generating texture data for the second polygons in dependence upon the texture data for the first polygons.

38. An apparatus for processing data defining a three-dimensional computer model comprising a mesh of polygons and texture data therefor, to generate data defining a texture coordinate map, the apparatus comprising:

storage area calculation means for determining, for each of at least some of the polygons in the three-dimensional computer model, a respective measure of the storage area to be allocated in the texture coordinate map to the texture data for the polygon, the storage area calculation means being arranged to allocate a relatively large storage area for texture data with a relatively low level of uniformity and a relatively small storage area for texture data with a relatively high level of uniformity; and means for generating the texture coordinate map by defining a respective polygon in a two-dimensional area for each of the at least some polygons in the three-dimensional computer model to store texture data therefor, such that each polygon is defined with an area dependent upon the storage area measure determined for the corresponding polygon from the three-dimensional computer model.

39. An apparatus for processing data defining a first texture map comprising a plurality of first polygons and texture data therefor in a first two-dimensional area, to generate data defining a texture coordinate map for a second texture map of smaller area than the first texture map, the apparatus comprising:

storage area calculation means for determining, for each of at least some of the first polygons in the first texture map, a respective measure of the storage area to be allocated to the texture data for a polygon in the second texture map, the storage area calculation means being arranged to allocate a relatively large storage area for texture data with a relatively low level of uniformity and a relatively small storage area for texture data with a relatively high level of uniformity; and means for generating a texture coordinate map by defining a respective second polygon in a second two-dimensional area for each of the at least some first polygons, such that the area of the second two-dimensional area is less than the area of the first two-dimensional area, and such that each second polygon is defined with an area dependent upon the storage area measure determined for the corresponding first polygon.

* * * * *

UNITED STATES PATENT AND TRADEMARK OFFICE

CERTIFICATE OF CORRECTION

PATENT NO. : 7,304,647 B2
APPLICATION NO. : 10/810605
DATED : December 4, 2007
INVENTOR(S) : Qi He Hong et al.

It is certified that error appears in the above-identified patent and that said Letters Patent is hereby corrected as shown below:

COLUMN 16:

Line 17, "1, 2 and 3 to 16." should read --1 to 16.--.
Line 23, "1, 2 and 4 to 16." should read --1 to 16.--.

Signed and Sealed this

Twenty-ninth Day of September, 2009

David J. Kappos
*Director of the United States Patent and Trademark Office*